United States Patent
Tonelli et al.

(10) Patent No.: US 10,709,287 B2
(45) Date of Patent: Jul. 14, 2020

(54) BEVERAGE-PRODUCING MACHINE WITH SINGLE SLIDE ACTUATOR FOR LOCKING HOPPER AND OPENING INGREDIENT APERTURE THEREIN

(71) Applicant: KONINKLIJKE PHILIPS N.V., Eindhoven (NL)

(72) Inventors: Stefano Tonelli, Eindhoven (NL); Cristiano Castelli, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 825 days.

(21) Appl. No.: 14/780,158

(22) PCT Filed: Mar. 25, 2014

(86) PCT No.: PCT/IB2014/060118
§ 371 (c)(1),
(2) Date: Sep. 25, 2015

(87) PCT Pub. No.: WO2014/162236
PCT Pub. Date: Oct. 9, 2014

(65) Prior Publication Data
US 2016/0051082 A1 Feb. 25, 2016

(30) Foreign Application Priority Data
Apr. 2, 2013 (EP) .................................... 13161978

(51) Int. Cl.
*A47J 31/44* (2006.01)
*A47J 31/42* (2006.01)
(Continued)

(52) U.S. Cl.
CPC ........... *A47J 31/4403* (2013.01); *A47J 31/42* (2013.01); *A47J 31/4407* (2013.01); *A47J 42/50* (2013.01); *A47J 43/0777* (2013.01)

(58) Field of Classification Search
CPC ......................... A47J 31/4471; B65D 2255/00
(Continued)

(56) References Cited

U.S. PATENT DOCUMENTS 4,438,704 A * 3/1984 Hutcheon ............ G07D 11/125
109/44
5,668,793 A * 9/1997 Ogawa ............... G11B 17/0434
360/99.18
(Continued)

FOREIGN PATENT DOCUMENTS

CN 102283578 A 12/2011
CN 102325485 A 1/2012
(Continued)

OTHER PUBLICATIONS

Notice of Allowance issued in connection with corresponding 2016-505907, dated Apr. 7, 2017, 5 pages.
(Continued)

*Primary Examiner* — Serkan Akar
*Assistant Examiner* — Spencer H. Kirkwood
(74) *Attorney, Agent, or Firm* — Schott, P.C.

(57) ABSTRACT

A beverage-producing machine includes a housing, a beverage producing unit arranged in the housing and a container for at least one beverage ingredient. The container is lockable to the housing and unlockable therefrom. The container includes a bottom aperture configured to dispense the ingredient contained therein and a shutter configured to selectively close and open the aperture. Furthermore, an actuating member is provided in the housing. The actuating member acts upon the shutter for selectively opening and closing the bottom aperture of the container while respectively locking the container to the housing and unlocking the container from the housing.

20 Claims, 9 Drawing Sheets

(51) Int. Cl.
*A47J 42/50* (2006.01)
*A47J 43/07* (2006.01)

(58) Field of Classification Search
USPC .................................. 99/295, 280, 285, 286
See application file for complete search history.

(56) References Cited

U.S. PATENT DOCUMENTS

| | | | |
|---|---|---|---|
| 5,791,526 A | 8/1998 | Landais et al. | |
| 6,057,514 A | 5/2000 | Maguire | |
| 8,690,088 B1* | 4/2014 | Lassota | A47J 42/38 |
| | | | 241/100 |
| 8,944,354 B2* | 2/2015 | Hulett | A47J 31/42 |
| | | | 241/100 |
| 2004/0123747 A1 | 7/2004 | Lassota | |
| 2006/0169147 A1* | 8/2006 | Cocchi | A23G 9/045 |
| | | | 99/275 |
| 2007/0063079 A1* | 3/2007 | Ford | A47J 31/42 |
| | | | 241/30 |

FOREIGN PATENT DOCUMENTS

| | | |
|---|---|---|
| DE | 202009013608 U1 | 4/2010 |
| DE | 202010001953 U1 | 4/2010 |
| DE | 202010001593 U1 | 1/2011 |
| EP | 2322382 A1 | 5/2011 |
| EP | 2380472 A1 | 10/2011 |
| FR | 2713906 A1 | 6/1995 |
| FR | 2901114 A1 | 11/2007 |
| JP | H06-343558 A | 12/1994 |
| JP | H07-285592 A | 10/1995 |
| JP | H09-94163 A | 4/1997 |
| JP | 2000-135169 A | 5/2000 |
| JP | 2002-360434 A | 12/2002 |
| JP | 2004-091031 A | 3/2004 |
| WO | 2004098361 A1 | 11/2004 |
| WO | 2010/085850 A1 | 8/2010 |

OTHER PUBLICATIONS

Office Action issued in connection with corresponding 201480019555. 9, dated May 24, 2017, 12 pages.
Notice of Allowance issued in connection with corresponding 2015146901, dated Jul. 28, 2017, 15 pages.
Office Action issued in connection with corresponding 2014246737, dated Nov. 9, 2017, 4 pages.
Office Action issued in connection with corresponding 201480019555. 9, dated Apr. 8, 2018, 8 pages.
Office Action issued in connection with corresponding 6768/CHENP/ 2015, dated May 6, 2019, 6 pages.

* cited by examiner

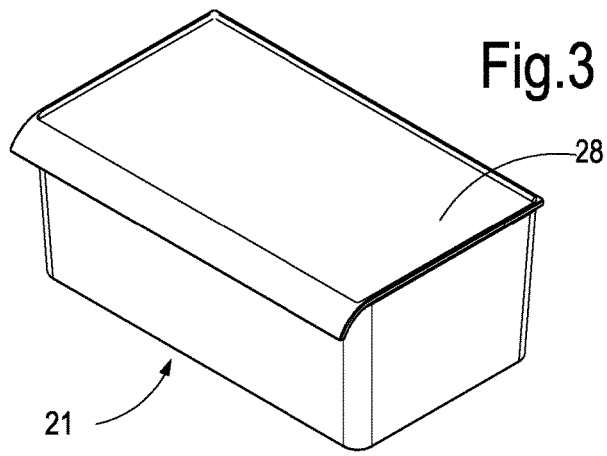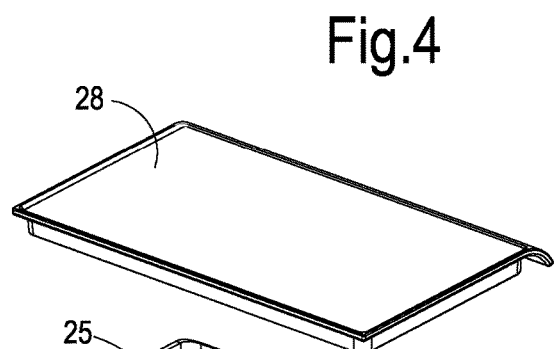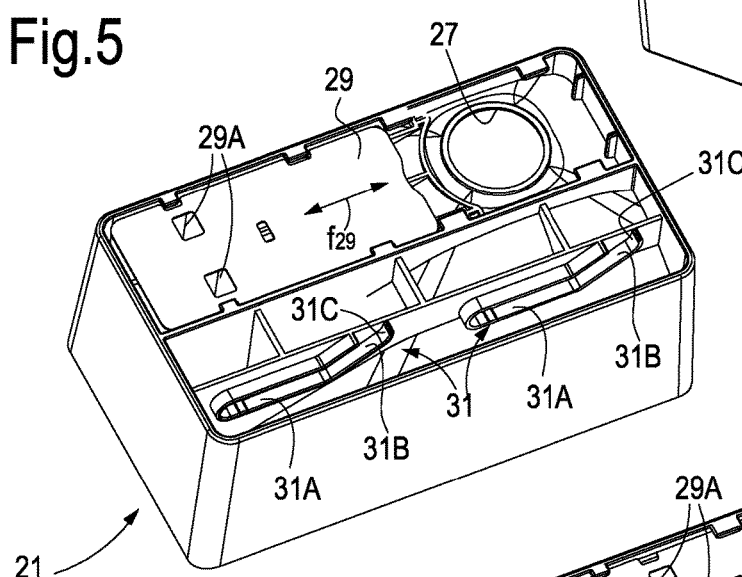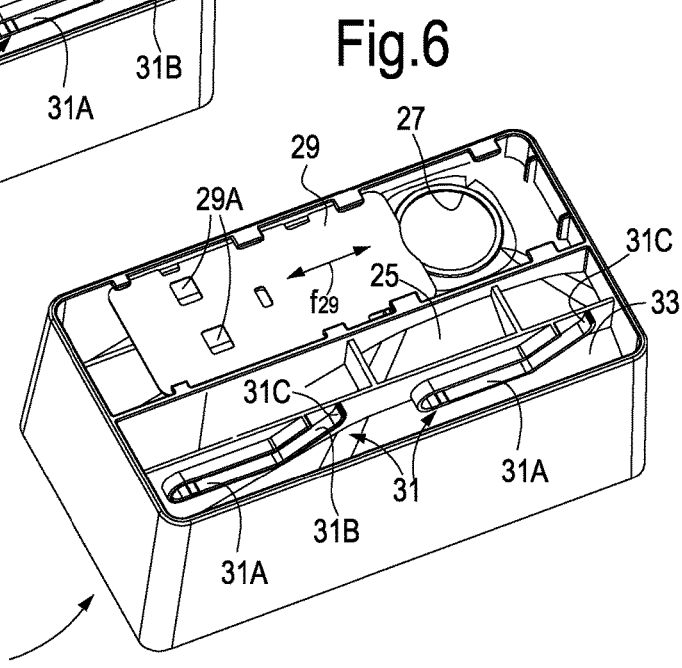

BEVERAGE-PRODUCING MACHINE WITH SINGLE SLIDE ACTUATOR FOR LOCKING HOPPER AND OPENING INGREDIENT APERTURE THEREIN

This application is the U.S. National Phase application under 35 U.S.C. § 371 of International Application No. PCT/IB2014/060118, filed on Mar. 25, 2014, which claims the benefit of European Application No. 13161978.5 filed on Apr. 2, 2013. These applications are hereby incorporated by reference herein.

TECHNICAL FIELD

The present invention concerns the field of beverage-producing machines. In particular, the invention concerns improvements in coffee-makers or similar beverage-producing machines, particularly for household applications.

BACKGROUND ART

Coffee producing machines are widespread and commonly used. In particular, coffee makers, such as espresso machines are becoming more and more popular. In some known machines of this kind the ingredients for the beverage preparation are loaded in bulk form in a container. Several espresso machines are known, wherein a hopper is formed in the machine housing for containing coffee beans. The amount of coffee beans in the hopper is sufficient for the preparation of a certain number of cups of coffee-based beverages such as cappuccino and espresso. A coffee grinder is arranged underneath the hopper and coffee beans are delivered by gravity from the hopper in the coffee grinder, possibly with the help of a screw feeder or auger. The coffee grinder is started at each brewing cycle, so that fresh coffee powder is ground each time by feeding a pre-set amount of coffee beans from the hopper to the grinder. The hopper is replenished whenever required.

Once a certain kind of coffee beans has been loaded in the hopper, the user cannot change the kind of coffee used, until the loaded coffee beans are fully used. Thus, if for example regular coffee beans are loaded in the hopper, the user cannot prepare a decaffeinated coffee, until the loaded beans are completely used. A separate manual loading compartment is usually provided in this kind of machines, which enables the user to load a different kind of coffee. However, this requires a manual operation and moreover only coffee powder can be loaded, but not coffee beans. The brewing cycle, moreover, has to be controlled at least partly in a manual way, rather than being fully automatic. This can be time consuming and uncomfortable.

Machines are also known, where the coffee beans or other beverage ingredients are contained in a removable container. It is thus possible to have a plurality of different containers with different ingredient qualities therein, for example decaffeinated coffee beans and regular coffee beans. The user can thus choose the kind of beverage he desires and select the correct container, which he will then attach to the machine.

WO 2010/085850 discloses a coffee maker with a removable coffee bean container. The coffee bean container is provided with a bottom aperture, through which the coffee beans are delivered towards a coffee grinder arranged inside the machine housing and underneath the seat where the container is installed before starting a brewing cycle. The coffee bean container comprises a dialer for manually operating a shutter which selectively opens and closes the aperture. Once the container has been introduced in the seat of the beverage-producing machine, the user operates the dialer to rotate the shutter. The aperture is opened and the container is locked to the coffee machine. After use, the opposite manual operation is performed, to close the bottom aperture and remove the coffee bean container from the beverage-producing machine.

SUMMARY OF THE INVENTION

According to a first aspect of the invention, a beverage-producing machine is provided, such as a coffee maker or the like, comprising a housing, a beverage producing unit in said housing, and a container or receptacle for at least one beverage ingredient, for example coffee beans. The container is advantageously lockable to the housing and unlockable therefrom. According to the invention the beverage-producing machine comprises a bottom aperture for dispensing by gravity the ingredient contained therein. A shutter is further provided, arranged and configured for selectively closing and opening the aperture. An actuating member is arranged in the housing, said actuating member acting upon the shutter for selectively opening or closing the bottom aperture of the container while respectively connecting and locking the container to the housing or unlocking and disconnecting the container from the housing. The same actuating member thus provides for opening and closing the ingredient dispensing aperture in the bottom of the container and locks or unlocks the container with respect to the machine housing. Manual closing of the container aperture is not required. A safer and user friendly operation of the machine is obtained.

According to some advantageous embodiments, a sensing arrangement is provided, for detecting whether the container is connected to the housing and for generating an enabling signal, which enables the operation of the beverage-producing machine only if the container is properly connected to the housing.

According to a different aspect, the invention also relates to a beverage-producing machine, such as a coffee maker or the like, comprising a housing, a beverage producing unit in said housing, and a container or receptacle for at least one beverage ingredient, for example coffee beans. The container is advantageously removably connectable to the housing and disconnectable therefrom and comprises a bottom aperture for dispensing by gravity the ingredient contained therein. A shutter is further provided, arranged and configured for selectively closing and opening the aperture. The container has a removable lid or cover, provided with a detectable element, designed and arranged for detection by a detecting arrangement comprising e.g. a sensor member, associated with the beverage-producing machine. The beverage-producing machine can be comprised of a control unit interfaced with the detecting arrangement. Activation of the machine, e.g. starting of a coffee bean grinder, is only enabled if the presence of the lid is detected through the detecting arrangement. Separate additional safety devices, such as a cover for a grinder inlet, can be dispensed with. Operation of hazardous machine members, such as the grinding wheels and/or the screw feeder of the grinder is in fact enabled only if the container and the lid are properly positioned in or on the machine housing, so that access to the interior of the machine members is safely prevented.

Sensing of the correct positioning of the container or of the lid can be obtained e.g. by means of proximity sensors, capacity sensors, magnetic sensors or the like.

In some embodiments, for example, a magnetic sensor can be arranged in or on the housing and a ferromagnetic element or a permanent magnet can be arranged at the container or preferably at the container lid. In other embodiments the detecting arrangement can comprise an optical sensor member, even though this configuration is currently not preferred, due to some potential criticalities originating from the presence of dust or other dirt which can adversely affect the operation of the sensor member.

According to particularly advantageous embodiments, which can apply to both aspects of the invention, the actuating mechanism and the shutter are configured such that the container is locked to the housing before opening the shutter and the shutter is closed before unlocking the container from the housing. With a single maneuver of the actuating mechanism is thus possible to sequentially locking the container and subsequently opening the shutter, so that loss of the beverage ingredients through the bottom aperture is prevented. The aperture is opened by the actuating mechanism only once the container has been arranged on the beverage-producing machine and correctly locked thereon. Vice-versa, when the container is to be removed, a single maneuvering movement of the actuating mechanism ensures closure of the shutter and subsequent unlocking of the container from the beverage-producing machine. Accidental loss of the ingredient through the container aperture due to premature removal of the container from the beverage-producing machine is thus avoided.

According to some embodiments, the actuating member can comprise at least one tooth arranged for co-action with the shutter. A tooth shall be understood as any mechanical member capable of engaging the shutter. The actuating member further comprises a cam follower for co-action with at least one cam profile arranged on the container, or vice-versa. Advantageously, the cam profile and the cam follower are configured and shaped for locking the container to the housing and unlocking the container from the housing.

In particularly advantageous embodiments, the tooth and the cam follower or cam profile are constrained to a common slider. The slider is arranged for performing a reciprocating movement between a first position, where the container is locked to the housing and the bottom aperture thereof is open, and a second position, where the container is released from the housing and the shutter closes the bottom aperture. The slider can be controlled by a manual lever. In other embodiments, the slider can be controlled by an actuator, such as an electric actuator or the like.

In particularly advantageous embodiments, two cam profiles and two cam followers are provided for locking and unlocking the container on and from the beverage-producing machine. As will become clearer from the following detailed description of one embodiment, a dual cam profile and dual follower arrangement can moves the container smoothly from a lifted position to a lowered position, in the latter the container being locked against a wall of a container-receiving seat formed in or on the housing of the beverage-producing machine. For example, the cam profiles can be shaped with a raising and lowering section, so that the co-action between the cam profile(s) and the cam follower(s) causes a raising and lowering movement of the container with respect to the housing of the beverage-producing machine.

The container can be placed e.g. on a top panel of the machine housing. In preferred embodiments, however, the housing is provided with a container seat, dimensioned for at least partly receiving the container therein. In some embodiments, the depth of the seat is such that the container can be entirely introduced in the seat. In other embodiments, the entire container except the lid thereof can be introduced in the seat.

The seat can be provided with a bottom wall and a through passage in the bottom wall. When the container is inserted in the seat, the bottom aperture of the container matches the through passage in the bottom wall of the seat, thus forming a continuous passage for the ingredient(s), for example coffee beans, contained in the container or receptacle. The ingredient can thus flow from the container into the beverage preparing components arranged inside the machine housing. For example, a coffee grinder can be arranged immediately below the through aperture. The grinder can be provided with a screw feeder which receives the beans flowing through the bottom aperture of the container and the through aperture of the bottom wall of the seat.

Further features and advantages of the invention are set forth in the following description of exemplary embodiments thereof and in the enclosed claims, which form an integral part of the present description.

It shall be understood that the various features of preferred embodiments disclosed above and described in more detail here below as well as features set forth in the claims can apply to both above mentioned aspects of the invention.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings:

FIG. 3 illustrates axonometric view of a coffee bean container with a lid arranged thereon;

FIG. 4 illustrates the coffee bean container of FIG. 3 with a lid removed;

FIGS. 5 and 6 illustrate a axonometric bottom views of the coffee bean container with the shutter in two different positions;

DESCRIPTION OF EMBODIMENTS OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
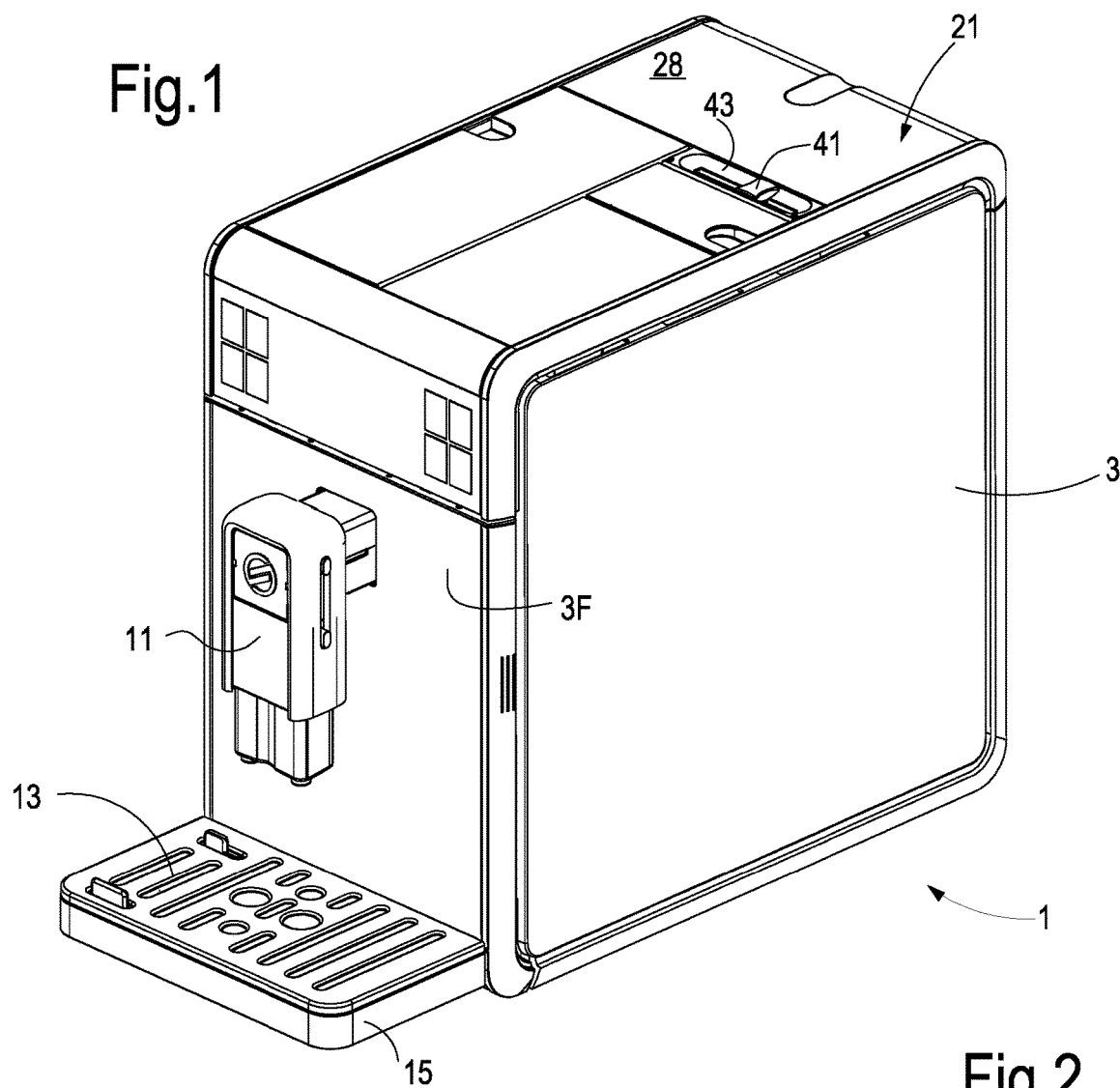
FIG. 1 illustrates an axonometric view of a beverage-producing machine, in particular an espresso or coffee machine embodying the invention.
Figure 2:
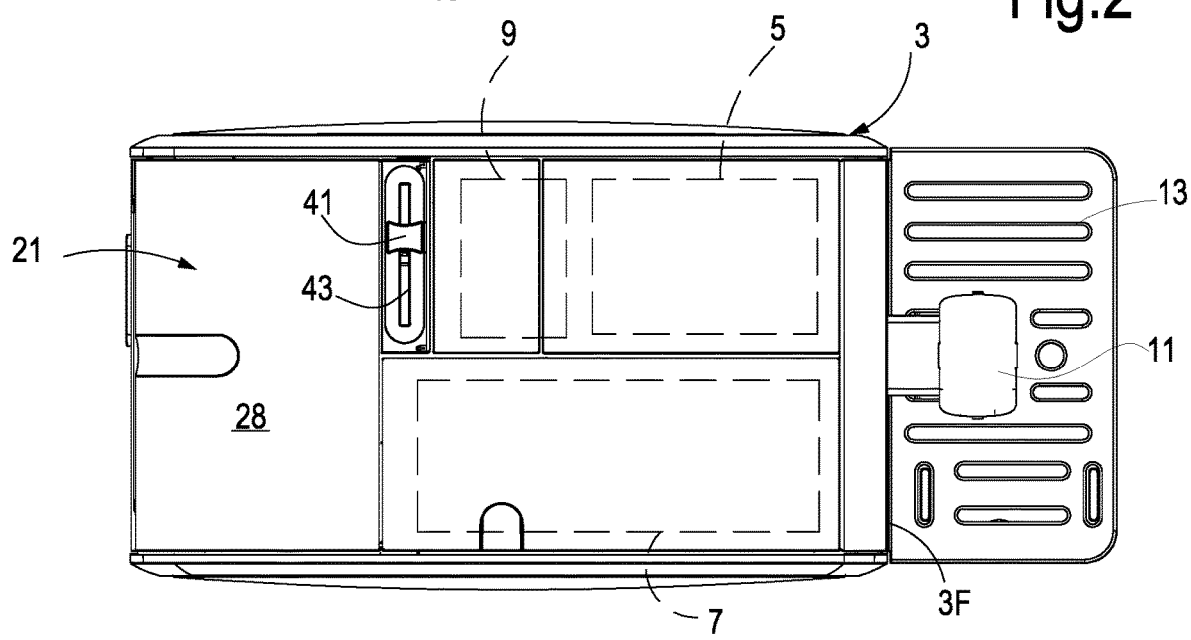
FIG. 2 illustrates a top view of the coffee machine of FIG. 1.

FIGS. 1 and 2 illustrate a beverage-producing machine, e.g. a coffee machine, more specifically an espresso machine, generally labeled 1. The coffee machine 1 comprises a housing 3, wherein devices and equipment are arranged, for the production of coffee-based beverages. The devices and equipment arranged inside machine 1 are known to those skilled in the art and will not be described in great detail. In short, generally speaking the machine 1 comprises a beverage-producing unit or brewing unit 5, a water tank 7, a water heater 9, a dispensing unit 11 projecting from a front panel 3F of the machine housing 3. The coffee machine 1 can further be provided with a grid 13 arranged under the dispensing unit 11, and closing a drip tray 15. A cup or other receptacle can be placed on the grid 13 under the dispensing unit 11 to collect the beverage dispensed by the coffee machine 1. Coffee powder is loaded and compacted in a brewing chamber (not shown) of the brewing unit 5. Water is pumped from the water tank 7 through the water heater 9 and through the coffee cake formed by the compacted coffee powder in the brewing chamber. The hot pressurized water extracts the edible substances from the coffee powder and the coffee beverage thus obtained is dispensed through nozzles provided in the dispensing unit 11.

The coffee machine 1 further comprises a removable coffee bean container 21. In some embodiments the coffee bean container 21 is partly or entirely housed in a seat provided in or on the housing 3 of the machine 1. In some embodiments the seat 23 is provided in the upper part of the machine housing 3. The seat can partly or entirely house the removable coffee bean container 21. The seat 23 can be seen in particular in FIGS. 8 and 10.

The coffee bean container is filled with coffee beans which are fed to a coffee grinder, described later on, arranged inside the machine housing 3. Upon initiation of a brewing cycle, coffee beans are fed to the coffee grinder which produces the desired mount of coffee powder that is loaded in the brewing chamber of brewing unit 5.

The structure and features of the removable coffee bean container 21 are best shown in FIGS. 3 to 6. The container 21 can be provided with a bottom 25 shaped in the form of a hopper, facilitating the movement under the effect of gravity of the coffee beans contained therein towards a bottom aperture 27. In some embodiments the bottom aperture 27 can be arranged in an off-centered position (see FIG. 7) of the coffee bean container 21.

The coffee bean container 21 is advantageously provided with a lid 28. The lid 28 can be entirely removable from the body of the coffee bean container 21 (see FIG. 4). In other embodiments the lid 28 can be hinged to the removable coffee bean container 21.

As can best be seen in the bottom views of FIGS. 5 and 6, the bottom aperture 27 can be selectively opened and closed by means of a movable shutter 29. The shutter 29 can be moved according to double arrow f29. The movement is controlled by means of an actuating member, housed in the coffee machine 1, which will be described later on. In some embodiments, the shutter 29 can be provided with a hole or indentation 29A, for engagement with corresponding teeth of the actuating member, as will be described in greater detail later on.

In some embodiments, the removable coffee bean container 21 comprises one or preferably two cam profiles 31. The cam profiles are intended for co-action with followers arranged in the seat 23 of the coffee machine 1, said followers being actuated by, or forming part of, the actuating member. As will become apparent from the following description, the cam profiles and relevant followers are provided for lifting and lowering the removable bean container 21 with respect to the seat 23 and for locking the removable coffee bean container 21 in position for use.

In some embodiments, each cam profile 31 extends generally parallel to the movement direction (arrow f29) of the shutter 29. More specifically, in some embodiments each cam profile 31 comprises a first rectilinear portion 31A extending substantially parallel to the direction of movement of the shutter 29, and a second portion 31B, which is inclined with respect to the direction of motion f29 of the shutter 29 and which extends from the bottom of the removable coffee bean container 21 towards the rectilinear portion 31A of the relevant cam profile 31. The two portions 31A and 31B of each cam profile 31 define a respective cam channel which is downwardly opened at 31C.

In some embodiments, the cam profiles 31 are arranged in a recess 33 opened at the bottom of the removable coffee bean container 21 and extending on a side of the hopper formed inside the container 21 by the bottom wall 25 thereof.

In the seat 23 of the coffee machine 1 an actuation member is arranged, which co-acts with the removable coffee bean container 21. This actuating member is best shown for example in FIG. 8 and will be described later on in more detail.

Figure 7:
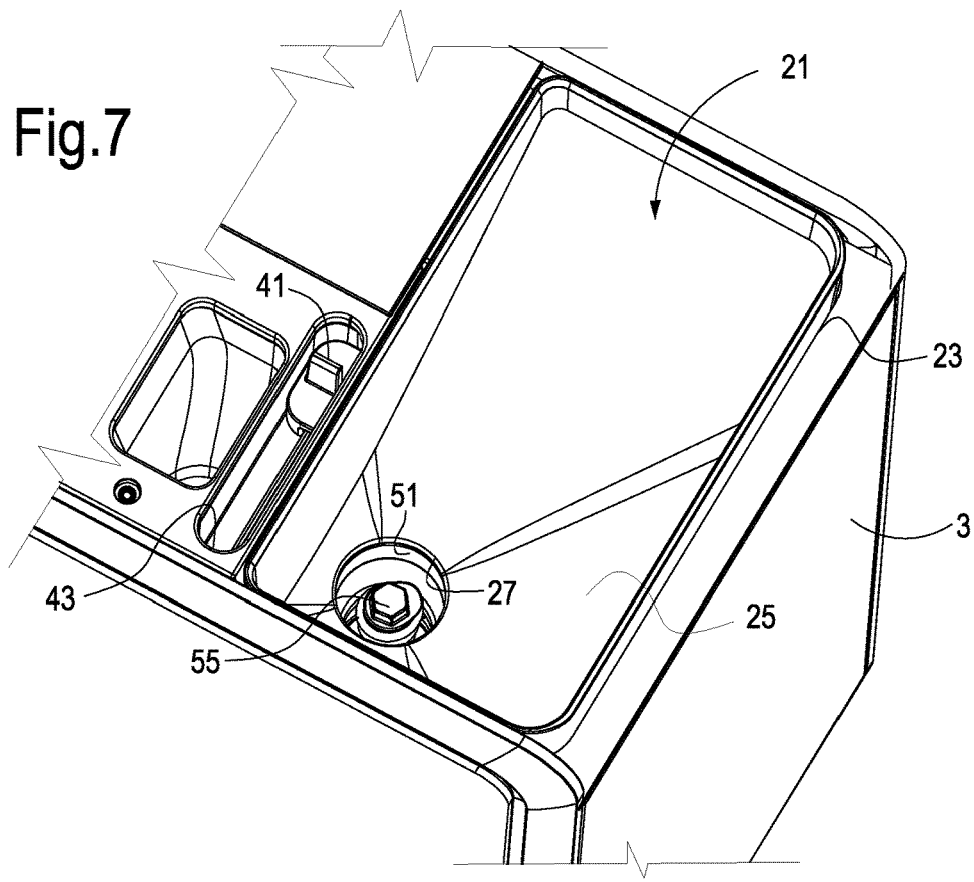
FIG. 7 illustrates an axonometric top view of the bean container installed in a seat provided in the housing of the coffee machine, in a position ready for dispensing the coffee beans in the coffee grinder.

According to some embodiments, the seat 23 comprises a bottom wall 23B. In some embodiments the bottom wall 23B comprises at least one slot 35. In general, a number of slots 35 corresponding to the number of holes or indentations 29A of shutter 29 are provided. A respective tooth 37 projects through each slot 35 towards the upper opening of the seat 23, and therefore towards the bottom of the removable coffee bean container 21, when the latter is inserted in the seat 23 (FIG. 7). Each tooth 37 corresponds to a respective hole or indentation 29A of the shutter 29 and is intended for co-action therewith.

In some embodiments, the teeth 37 are constrained to a slider 39 arranged underneath the bottom wall 23B of seat 23. The slider 39 is shown in cross-section in FIG. 10, for example. The slider 39 is movable with a reciprocating motion according to double arrow f39. Movement of the slider 39 can be controlled by an actuator, for example an electric motor 84 housed in the housing 3 of the coffee machine 1. In other embodiments the movement of the slider 39 is controlled manually, for example by means of a lever or appendage 41. The lever or appendage 41 can be integrally formed with the slider 39 or mechanically constrained thereto. Moreover, the lever 41 is advantageously freely accessible to the user for operating the slider 39. In some embodiments, the lever or appendage 41 is housed in a cavity 43 provided on a side of the seat 23 on the top of the housing 3.

The slider 39 further comprises feelers co-acting with the cam profiles 31 provided on the coffee bean container 21. In the embodiment shown in the drawings two feelers 45 are provided as there are two cam profiles 31. Each feeler projects through a respective slot 47 in the bottom wall 23B of the seat 23 and extending parallel to the slots 35 and to the direction of movement (arrow f39) of the slider 39.

The slider 39 and the components mounted thereon form an actuator member co-acting with the removable coffee bean container 21.

A through passage 49 is further formed in the bottom wall 23B. The through passage 49 is located above a duct 51 leading to a coffee grinder 53 (see FIG. 10) arranged under the seat 23. In some embodiments the coffee grinder comprises a feeding screw or auger 55 extending into the duct 51 towards the through passage 49.

In some embodiments the lid 28 of the removable coffee bean container 21 comprises a detectable element 61 which can be detected by a sensing member 63 (see in particular FIG. 10) arranged in or on the machine housing 3. The sensing member 63 can be interfaced with an electronic control unit 65, schematically shown in FIG. 10 and omitted from the remaining figures for the sake of simplicity. The electronic control unit 65 can be connected to a motor 67 of the grinder 53 and, via one or more electric connectors 69, to other instrumentalities of the coffee machine 1, for example a water pump, a flow meter, temperature sensors, an actuator for the brewing unit 5 and the like.

The sensor member 63 detects the correct positioning of the lid 28 and of the removable coffee bean container 21 upon insertion of the latter in seat 23. If the removable coffee bean container 21 is properly set into the seat 23 and the lid 28 is correctly placed on the removable bean container 21, the sensor member 63 will generate an enabling signal to the electronic control unit 65. Only upon receipt of the enabling signal from the sensor member 63 the electronic control unit 65 will enable the operation of the coffee grinder 53.

In the absence of an enabling signal from the sensing member 63, the operation of the coffee grinder 53 is inhibited. A safety arrangement is thus obtained, preventing a hazardous situation where the coffee grinder 53 (including the feeding auger 55) start rotating without any safety closure preventing for example accidental insertion by the user of a finger in the area of operation of the rotating mechanical parts of the grinder. The coffee grinder 53 will only be set into motion if the removable coffee bean container 21 and the lid 28 thereof are correctly mounted, preventing the user from accidentally contacting moving parts of the coffee machine 1.

The movements of the various components described so far, and the operations required for locking/unlocking the removable bean container 21 with respect to the seat 23 will now be described in greater detail, reference being made to the FIGS. 7 to 18.

Figure 8:
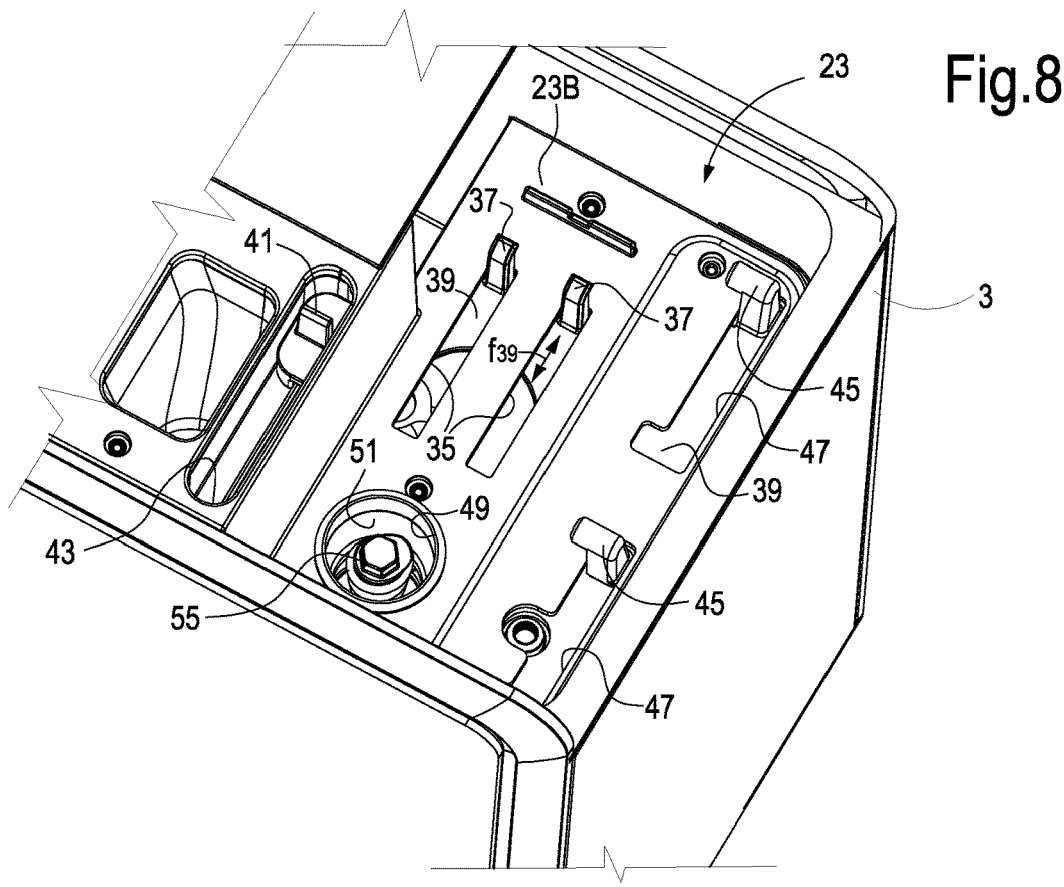
FIG. 8 illustrates the seat with the coffee bean container removed and showing an actuator member for acting upon the coffee bean container, the actuating member being in the same position as in FIG. 7.
Figure 9:
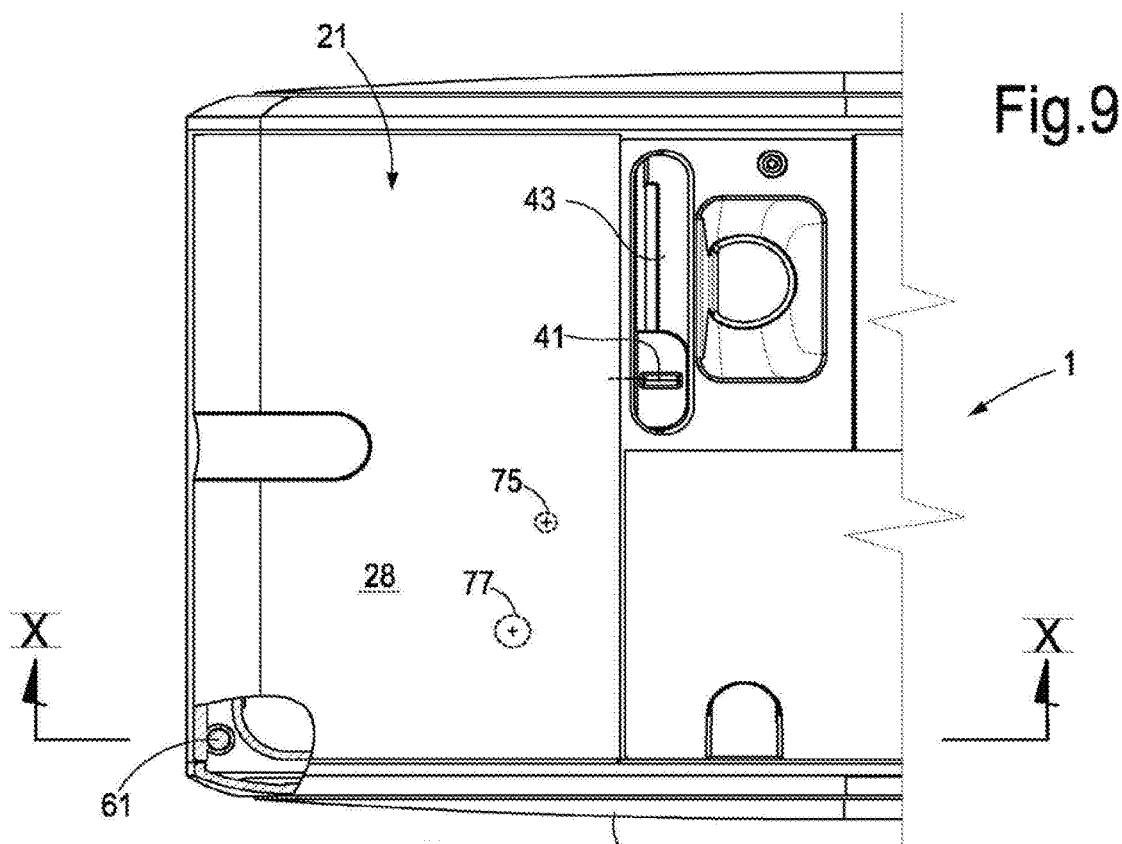
FIG. 9 illustrates a top view of a portion of the coffee machine with the bean container closed by a lid.
Figure 10:
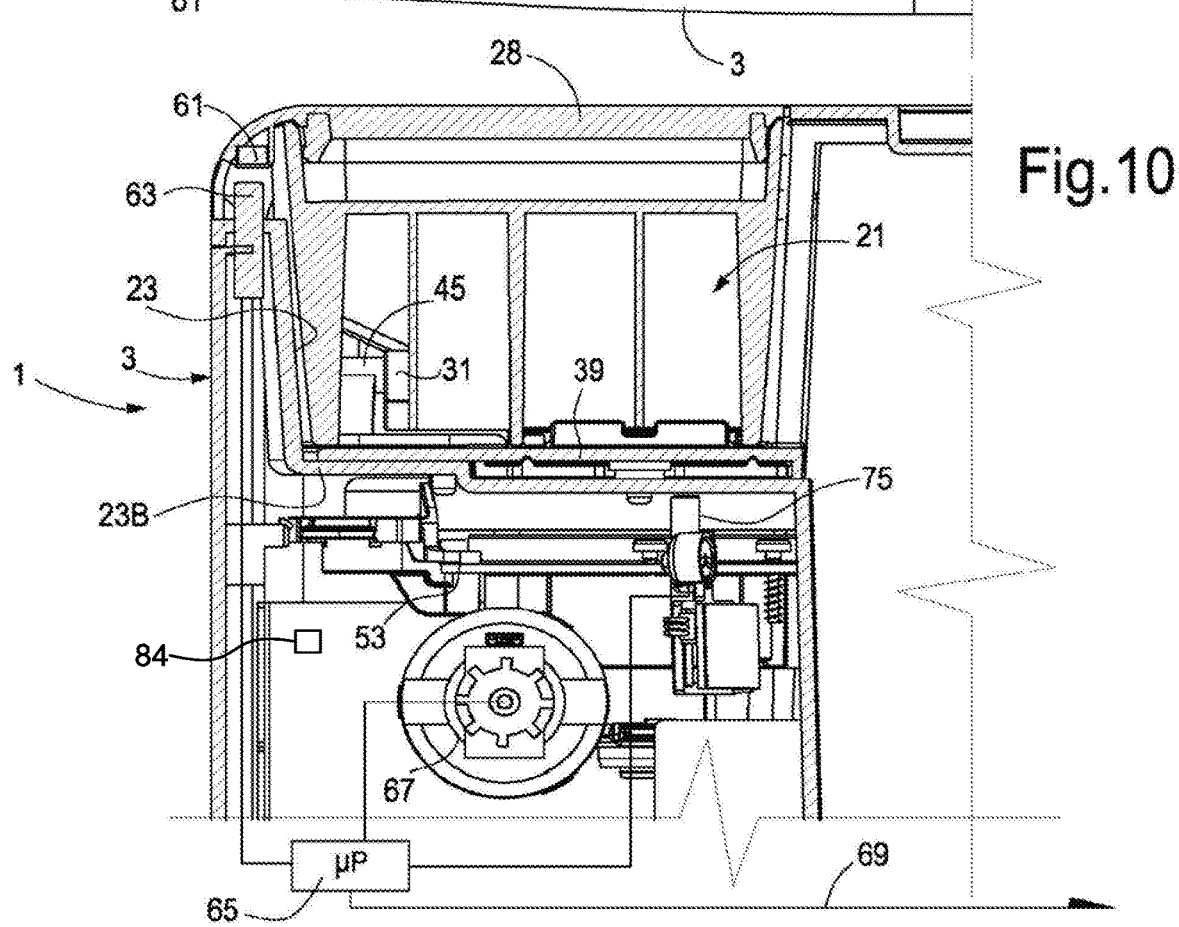
FIG. 10 illustrates a section according to line X-X of FIG. 9.
Figure 11:
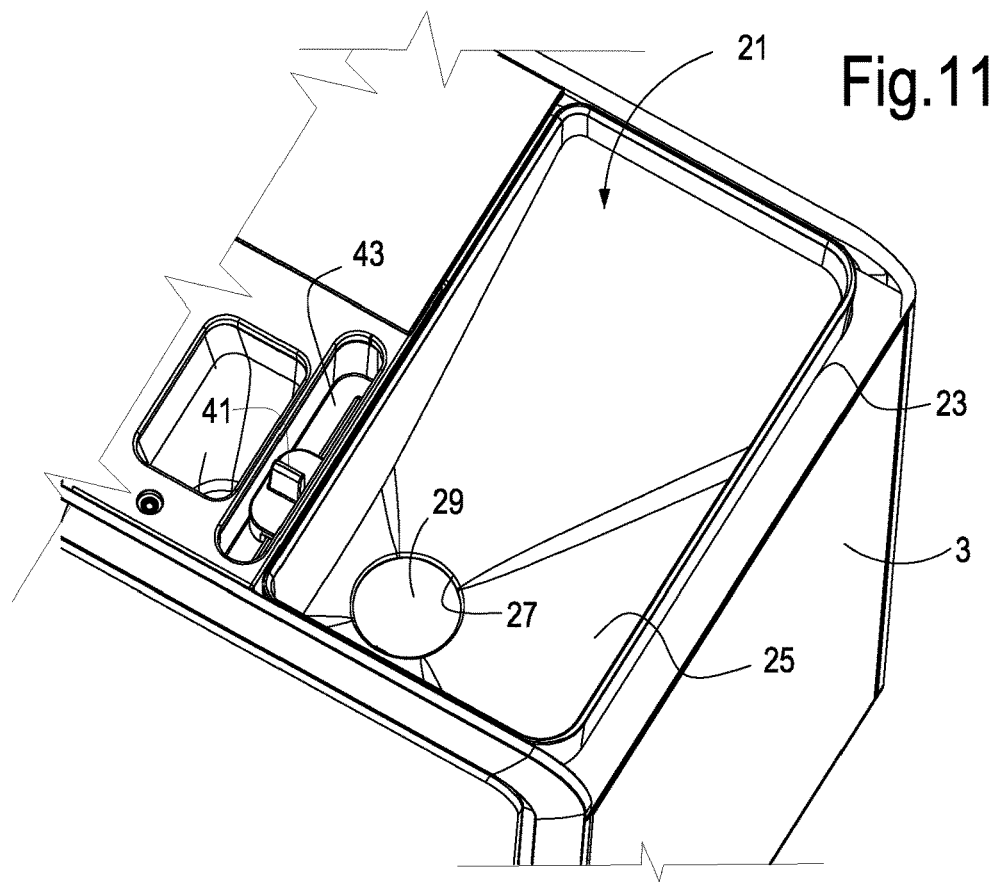
FIG. 11 illustrates an axonometric top view similar to FIG. 7 in an intermediate position with the shutter closed and the bean container still engaged with the coffee machine.
Figure 12:
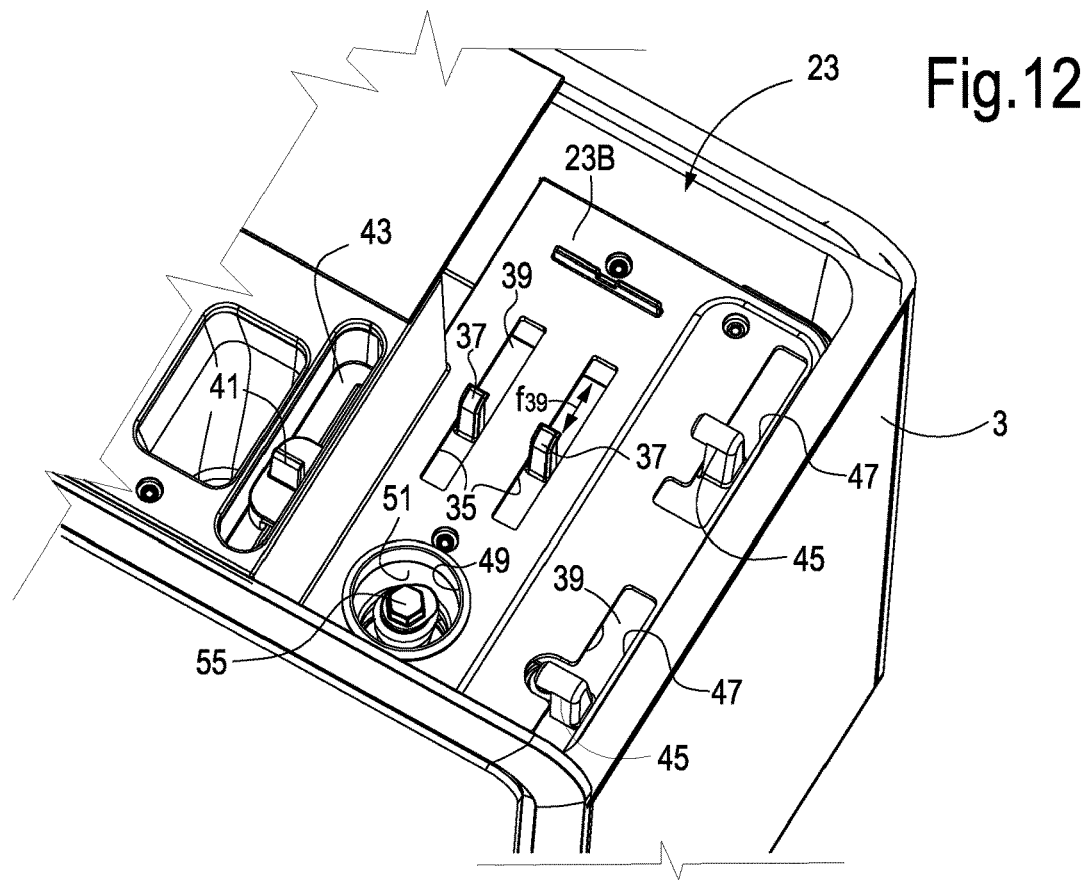
FIG. 12 illustrates the seat of the coffee bean container with the coffee bean container removed and the actuator member in the position of FIG. 11.

Referring specifically to FIGS. 7 through 10, when the removable bean container 21 is inserted in the seat 23 and locked therein, the actuating member comprised of the slider 39, the lever 41, the teeth 37 and the followers 45 will be in the position shown in FIG. 8. The teeth 37 engaged into holes 29A of the shutter 29 (FIG. 5) and have moved the slider 29 in the completely open position (FIG. 5) so that the bottom aperture 27 of the removable coffee bean container 21 is entirely open, as can be seen in FIG. 7. The duct 51 is in communication with the interior of the removable coffee bean container 21 and the auger 55 faces the bottom aperture 27. Coffee beans (not shown) contained in the removable coffee bean container 21 can thus flow through the bottom aperture 27 in the duct 51 and be fed by rotation of the auger 55 towards the coffee grinder 53. As stated above, a precondition for the coffee grinder 53 to operate, is however that the lid 28 be properly positioned on top of the removable coffee bean container 21 as shown in FIG. 10, the lid being removed in FIG. 7 for the sake of showing the interior of the removable bean container 21.

In the position shown in FIG. 8, the cam followers 45 engage in the rectilinear portions 31A of the respective cam profiles 31. In this way the cam followers 45 pull the removable coffee bean container 21 against the bottom wall 23B of seat 23.

When the removable coffee bean container 21 shall be removed, for example in order to use a different container containing another kind of coffee, the user simply moves the lever 41 from the position of FIGS. 7 and 8 to the position of FIGS. 15, 16, 17, and 18. The followers 45 and the teeth 37 are thus shifted on the opposite side of the respective slots 35 and 47. This movement causes on the one hand the shutter 29 to be displaced in front of the bottom aperture 27, closing it. On the other hand, the cam followers 45 move along the cam profiles 31 along the sections 31A and subsequently 31B thereof, thus lifting the removable bean container 21 upwards. At the end of this operation the removable coffee bean container 21 is partly lifted from the original position and projects from the seat 23. The cam followers 45 will be positioned at the apertures 31C of the cam profile 31, so that they will release the removable coffee bean container 21, which can be removed by lifting it out of the seat 23. The user can easily grasp the container and remove it from the seat 23.

Figure 18:
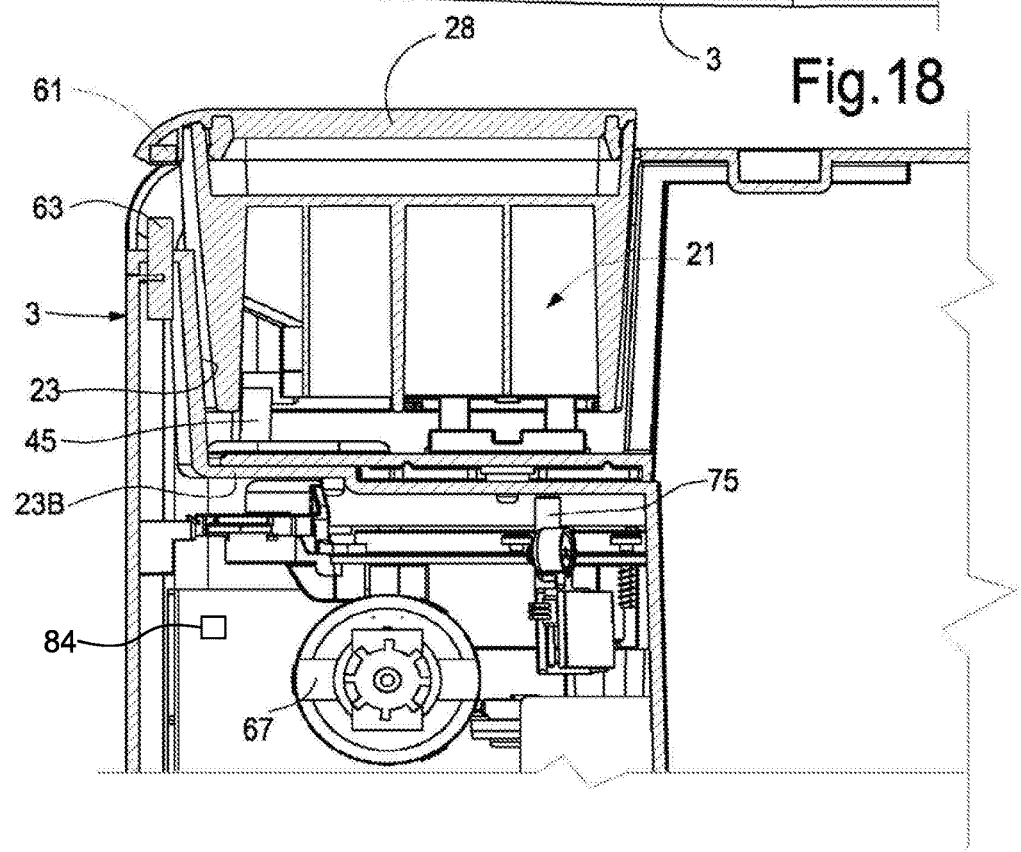
FIG. 18 illustrates across-section according to line XVIII-XVIII of FIG. 17.

As can best be seen in FIG. 18 the element 61 embedded or fixed in the lid 28 has been distanced from the sensing member 63, so that operation of the coffee grinder 53 would be prevented, as no enabling signal will be provided by the sensing member 63.

Figure 16:
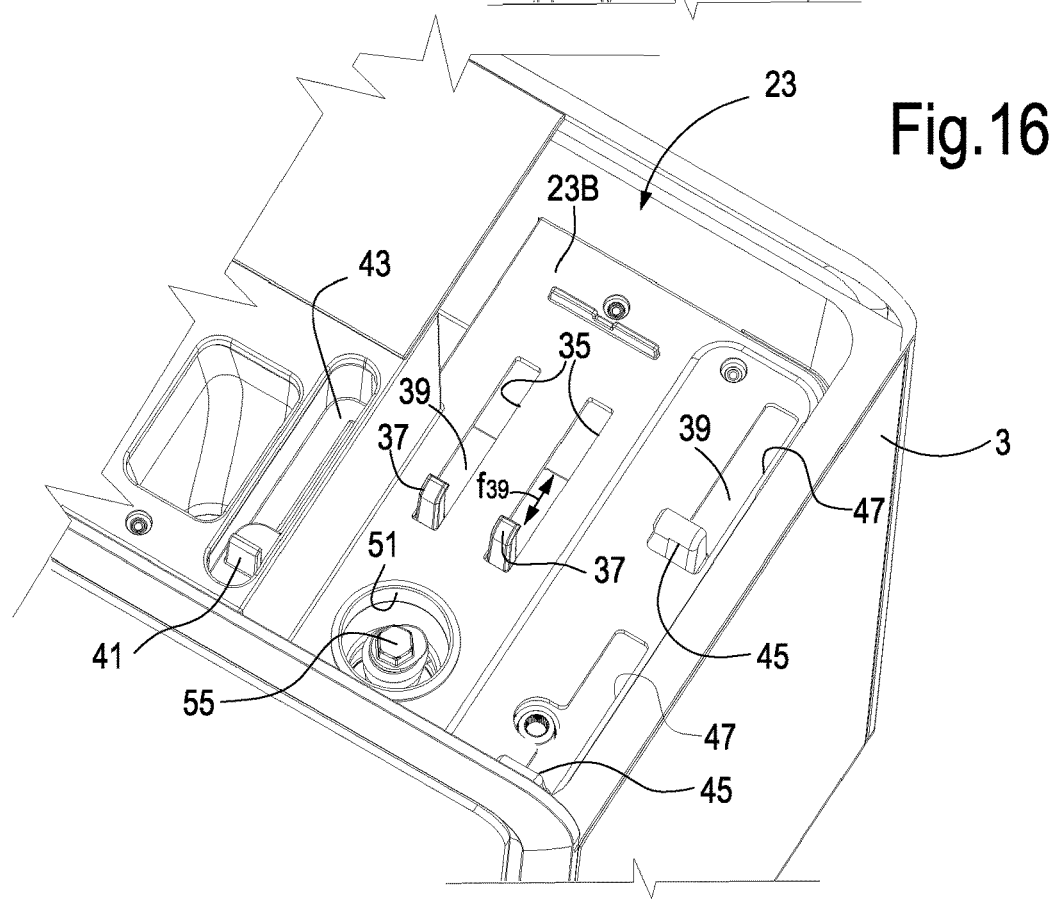
FIG. 16 illustrates the seat with the coffee bean container removed and the actuating member in the same position as in FIG. 15.
Figure 17:
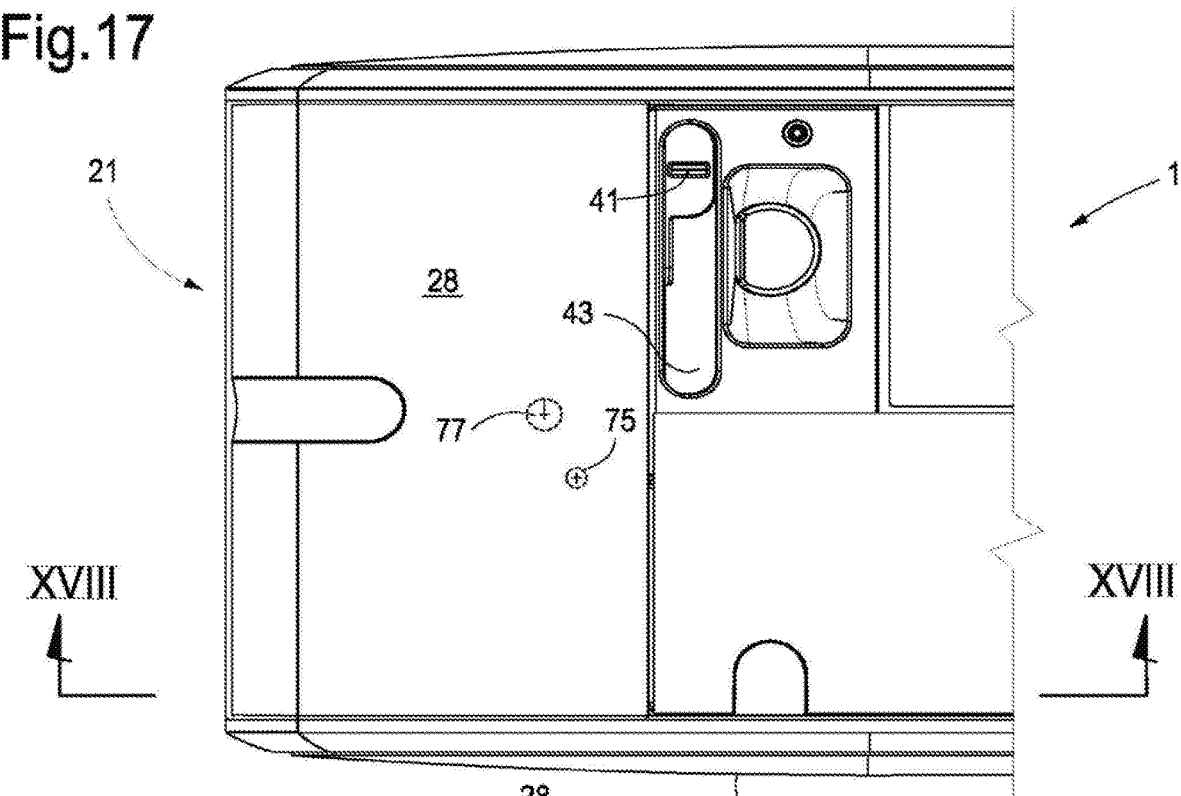
FIG. 17 illustrates a top view of a machine portion and the bean container with the lid mounted thereon in the position of FIG. 15.

The position and the shape of teeth 37, cam followers 45, cam profiles 31 and shutter 29 are such that when moving the slider 39 from the position of FIG. 8 to the position of FIG. 16, the shutter 29 will close the bottom aperture 27 before the cam followers 45 release and lift the removable bean container 21. This is made possible in particular by the shape and position of the cam profiles 31. It is thus ensured that the bottom aperture 27 of the removable coffee bean container is closed and no coffee beans are lost before the removable bean container 21 is lifted from its locked position.

In some embodiments an intermediate operating position of the actuating member can be provided. The intermediate operating position is between the position of FIGS. 7 through 10 and the position of FIGS. 15 through 18. This intermediate operating position is shown specifically in FIGS. 11, 12, 13 and 14. In the intermediate operating position the slider 39 is located between the two end positions shown in FIGS. 8 and 16, respectively. The shutter 29 already entirely closed the bottom aperture 27. The cam followers 45 of the actuating member, however, are still engaged in the horizontal rectilinear portion 31A of each respective cam profile 31, so that the removable coffee bean container 21 is still retained in the seat 23 and is pulled against the bottom wall 23B of the seat 23. This is a safety condition, in which the enabling signal is still generated by the sensor member 63, since the element 61 carried by the lid 28 is still sensed by the sensor member 63. The coffee grinder 53 can thus be operated, for example in order to grind and remove residual coffee beans contained in the duct 51.

Since the bottom aperture 27 is closed by shutter 29, however, no further coffee beans are dispensed from the removable coffee bean container 21. Rotation of the coffee grinder 53 can be continued until no residual coffee beans remain in the duct 51 and/or in the coffee grinder 53. This ensures that the subsequent brewing cycle performed using a different coffee quality, will not be contaminated by coffee beans used for the previous brewing cycles.

This intermediate position can be detected by an auxiliary sensor member 75 (see in particular FIGS. 14, 10 and 18) which is located so as to detect the presence of an element 77 (FIG. 14) carried by the slider 39. The sensor member 75 can be a proximity sensor, a magnetic sensor, a capacity sensor, or the like.

Figure 13:
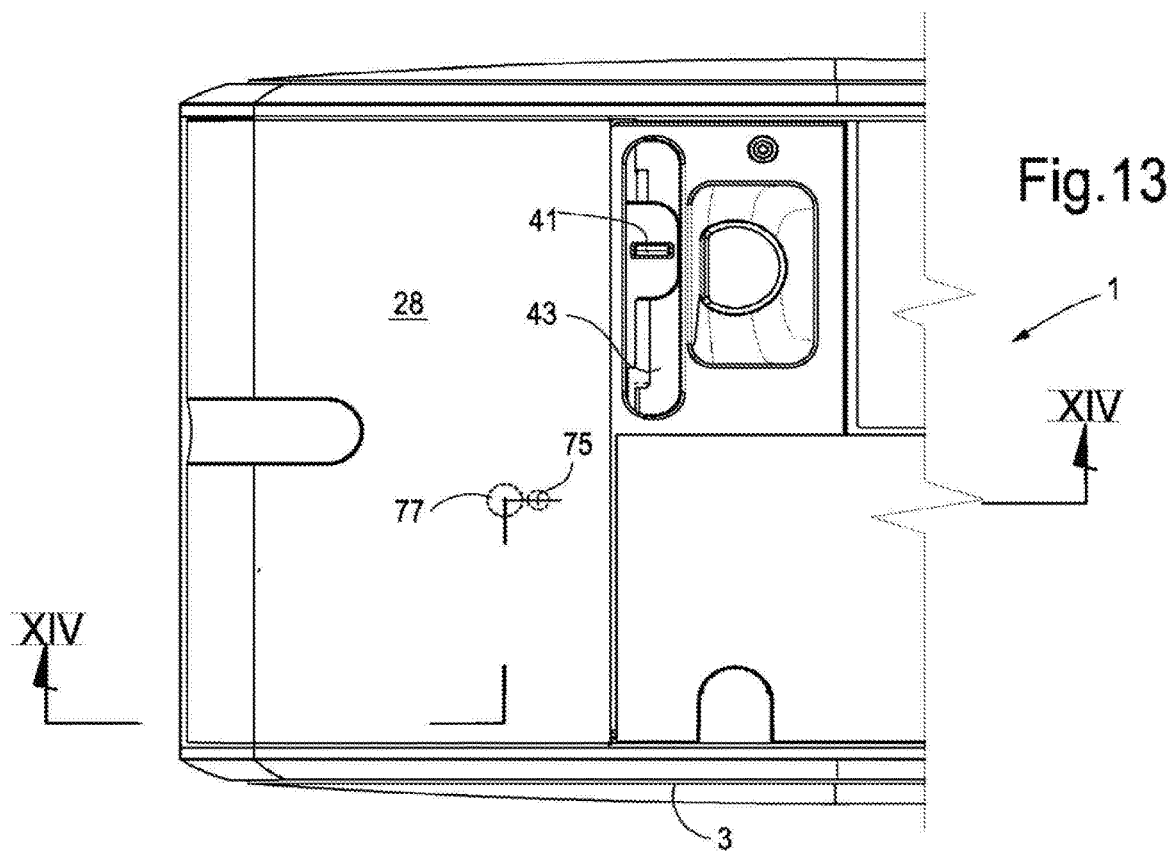
FIG. 13 illustrates a top view similar to FIG. 9, in the position of FIG. 11.
Figure 14:
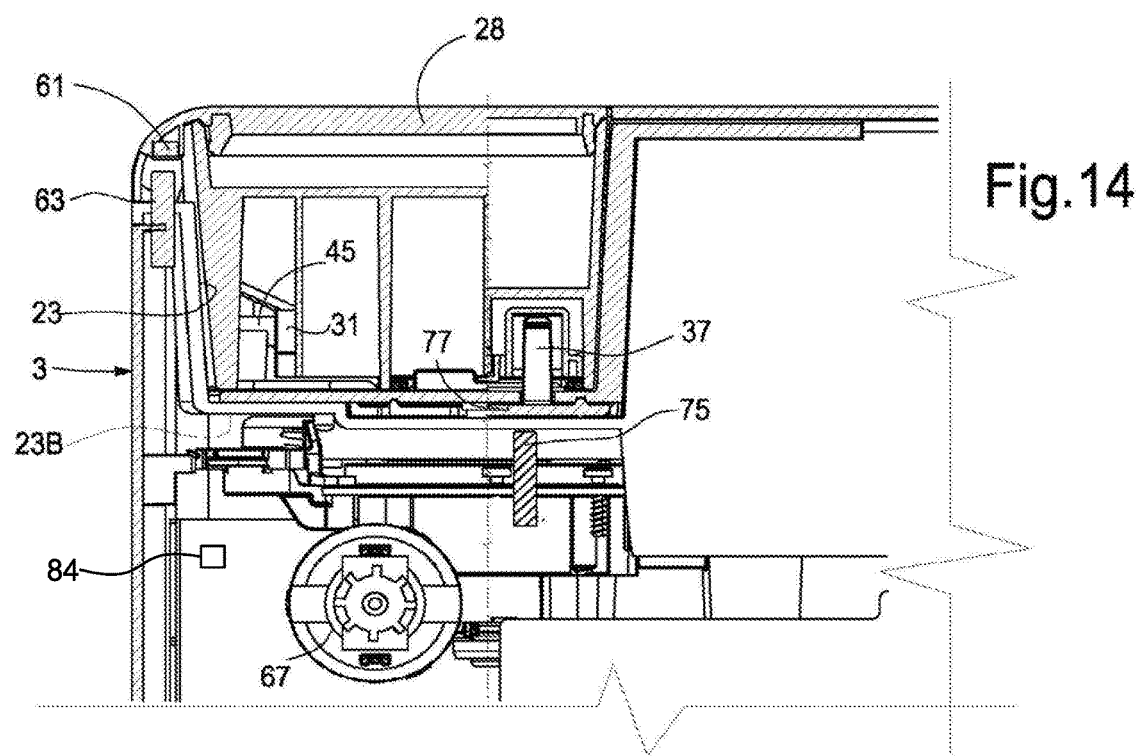
FIG. 14 illustrates a cross-section according to line XIV-XIV of FIG. 13.
Figure 15:
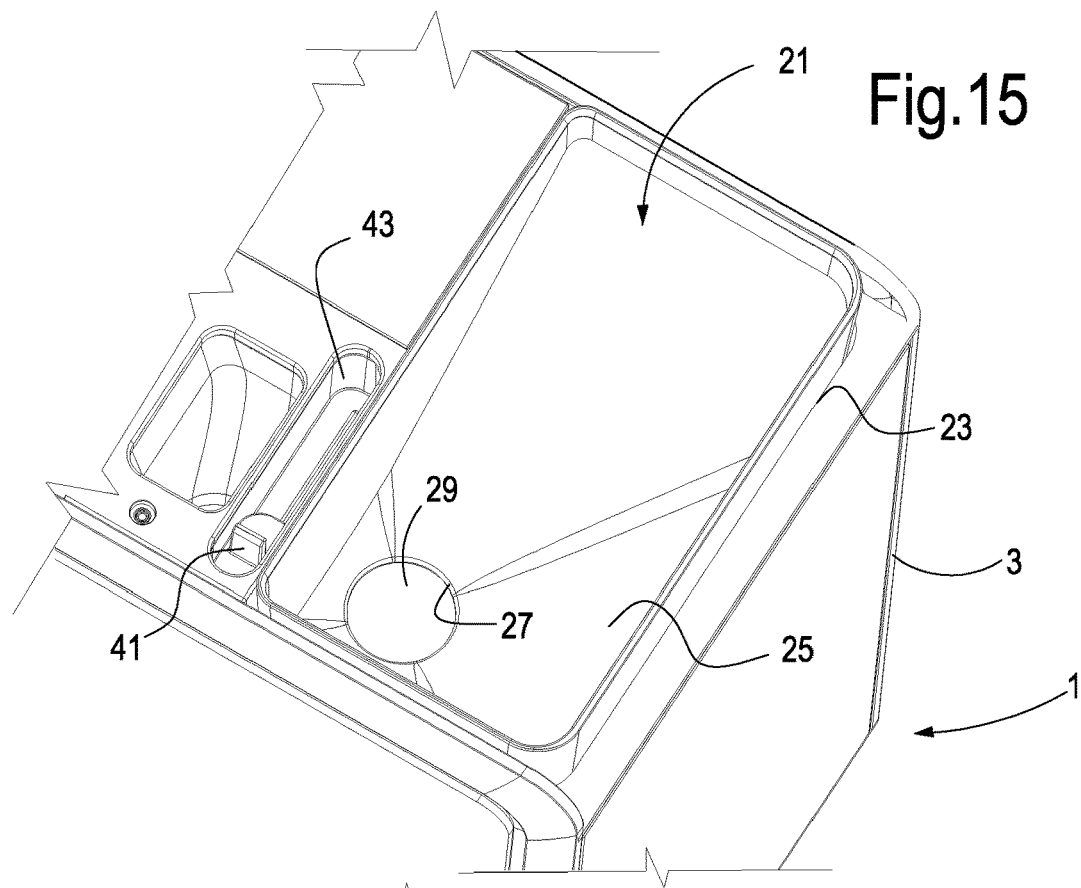
FIG. 15 illustrates a top axonometric view similar to FIG. 11, with the coffee bean container unlocked and partly lifted from the seat.

In FIG. 13 the sensor member 75 and the sensing element 77 are shown in dotted lines and in alignment, in the position where the element 77 is sensed by the sensor member 75, the latter being electrically connected with the electronic control unit 65 (FIG. 10) to provide an enabling signal.

Figure 19:
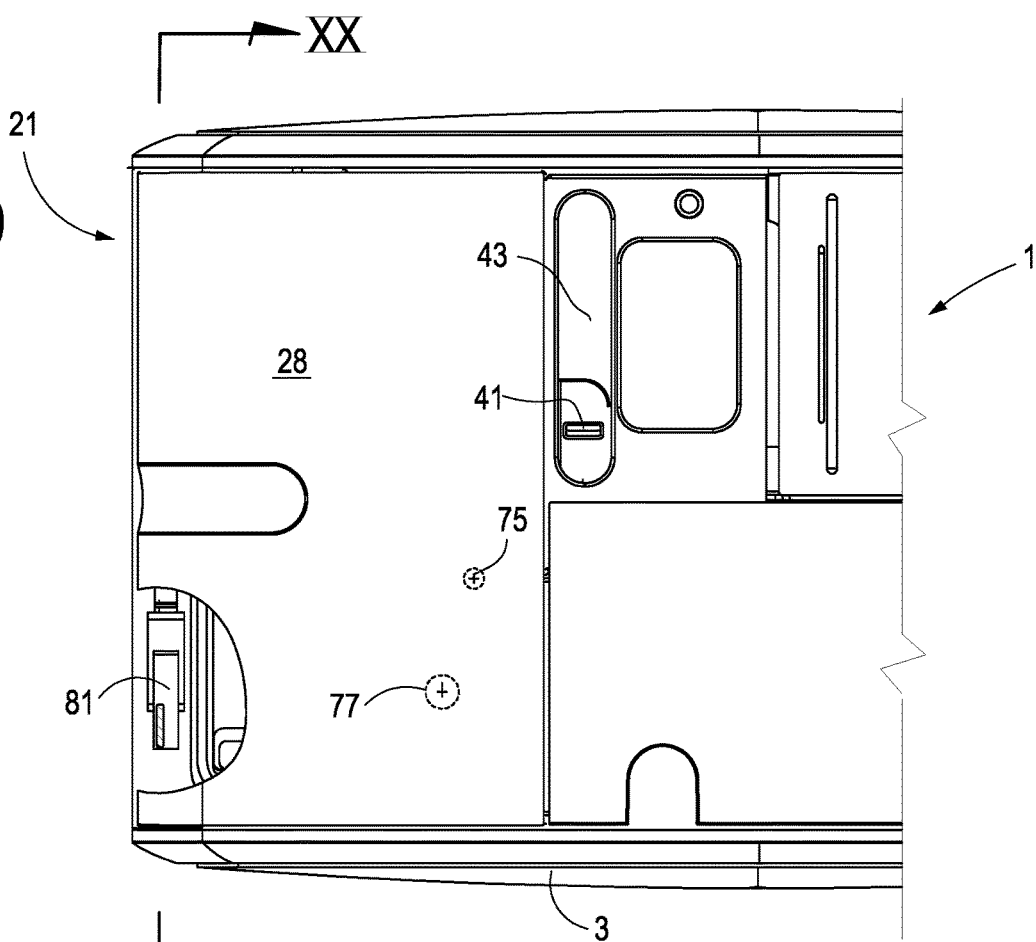
FIG. 19 illustrates a top view similar to FIG. 9 in a modified embodiment.
Figure 20:
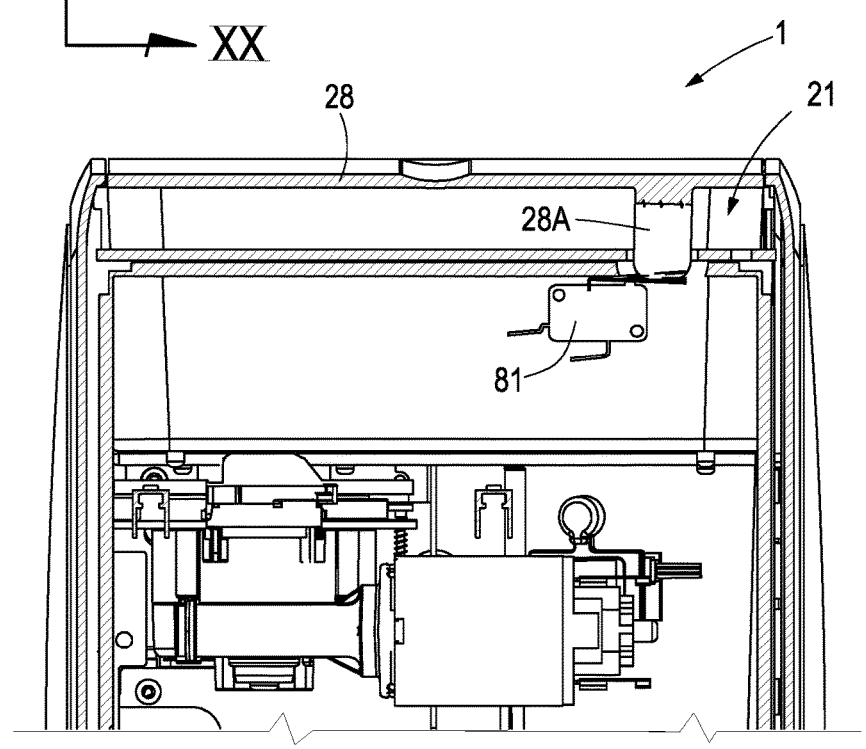
FIG. 20 illustrates a cross-section according to line XX-XX in FIG. 19.

The correct position of the removable coffee bean container 21 and relevant lid 28, as a precondition to generate the enabling signal which allows the coffee grinder to start rotating, can be generated in any other useful manner, for example using a micro switch 81 (FIGS. 19 and 20), which is acted upon by the lid 28 when the latter, together with the removable coffee bean container 21, are correctly positioned and locked in the seat 23. In some embodiments the lid 28 can be provided with a projection 28A (FIG. 20) co-acting with the micro switch 81 to give the enabling signal to the control unit 65 of the machine 1.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage-producing machine, comprising:
a housing;
an actuating member in the housing, wherein the actuating member comprises at least one tooth, and wherein the at least one tooth is constrained to a slider;
a beverage producing unit in said housing; and
a container for at least one beverage ingredient,
wherein the container is configured to be locked to the housing and unlocked therefrom,
wherein the container comprises a bottom aperture for dispensing the at least one beverage ingredient contained therein and a shutter for selectively closing and opening the bottom aperture, and
wherein the actuating member is configured to act upon the shutter by engaging the at least one tooth with the shutter and configured to simultaneously move the slider which changes the position of the at least one tooth from a first position to a second position for selectively opening and closing the bottom aperture of the container while respectively locking the container to the housing and unlocking the container from the housing.

2. The beverage-producing machine according to claim 1, further comprising a sensing arrangement configured to detect whether the container is connected to the housing and to generate an enabling signal for enabling operation of the beverage-producing machine only if the container is properly connected to the housing.

3. The beverage-producing machine according to claim 2, wherein the container has a removable lid, and wherein the sensing arrangement is further configured to provide the enabling signal when the lid is applied on the container and the container is properly connected to the housing.

4. The beverage-producing machine according to claim 2, further comprising a bean grinder configured to grind coffee beans dispensed through the bottom aperture of the container, wherein operation of the beam grinder is enabled by said enabling signal.

5. The beverage-producing machine according to claim 1, wherein the actuating member comprises:
at least one cam follower for co-action with at least one cam profile arranged on the container, the at least one cam profile being configured to lock the container to the housing and unlock the container from the housing.

6. The beverage-producing machine according to claim 5, wherein said at least one cam follower or cam profile are constrained to the slider, and wherein the slider performs a reciprocating movement between the first position, where the container is locked to the housing and the bottom aperture is open, and the second position, where the container is released from the housing and the shutter closes the bottom aperture.

7. The beverage-producing machine according to claim 1, wherein the slider is controlled by a single lever.

8. The beverage-producing machine according to claim 5, wherein the at least one cam follower includes two cam followers configured to co-act with two cam profiles of the at least one cam profile.

9. The beverage-producing machine according to claim 5, wherein the at least one cam profile is shaped with a raising and lowering section, so that the co-action between the at least one cam profile and the at least one cam follower causes a raising and lowering movement of the container with respect to the housing.

10. The beverage-producing machine according to claim 1, wherein the housing has a seat dimensioned for at least partly receiving the container therein.

11. The beverage-producing machine according to claim 10, wherein the seat has a bottom wall and a through passage in the bottom wall, and wherein when the container is inserted in the seat, the bottom aperture of the container matches the through passage in the bottom wall of the seat.

12. The beverage-producing machine according to claim 11, further comprising a bean grinder arranged underneath the through passage and configured to grind coffee beans dispensed through the bottom aperture of the container.

13. The beverage-producing machine according to claim 1, further comprising a detection member constrained to the actuating member, and a sensing device combined with the housing, said sensing device being configured to detect an intermediate position of the actuating member, wherein in the intermediate position the bottom aperture of the container is closed by the shutter while the container is still locked to the housing.

14. A beverage-producing machine, comprising:
a housing;
an actuating member in the housing, wherein the actuating member comprises at least one tooth, and wherein the at least one tooth is constrained to a slider;
a beverage producing unit in said housing; and
a container for at least one beverage ingredient,
wherein the container is removably connectable to the housing and disconnectable therefrom, and comprises a bottom aperture configured to dispense by gravity the at least one beverage ingredient contained therein,
wherein the container comprises a shutter configured to selectively close and open the bottom aperture,
wherein the container has a removable lid, provided with a detectable element, co-acting with a sensing member associated with the beverage-producing machine, and
wherein the actuating member is configured to act upon the shutter by engaging the at least one tooth with the shutter and configured to simultaneously move the slider which changes the position of the at least one tooth from a first position to a second position for selectively opening and closing the bottom aperture of the container while respectively locking the container to the housing and unlocking the container from the housing.

15. The beverage-producing machine according to claim 14, further comprising a controller, wherein the sensing member is configured to generate an enabling signal, and the controller is configured to inhibit operation of at least one machine component if the enabling signal is absent.

16. A beverage-producing machine, comprising:
a housing;
an actuator in the housing, wherein the actuating member comprises at least one tooth, and wherein the at least one tooth is constrained to a slider;
a beverage producing device in said housing; and
a container for at least one beverage ingredient,
wherein the container is configured to be locked to the housing and unlocked therefrom,
wherein the container comprises a bottom aperture for dispensing the at least one beverage ingredient contained therein and a shutter for selectively closing and opening the bottom aperture, and
wherein the actuator is configured to act upon the shutter by engaging the at least one tooth with the shutter and configured to simultaneously move the slider which changes the position of the at least one tooth from a first position to a second position for selectively opening and closing the bottom aperture of the container while respectively locking the container to the housing and unlocking the container from the housing.

17. The beverage-producing machine of claim 16, further comprising a detector configured to detect whether the container is connected to the housing and to generate an enabling signal for enabling operation of the beverage-producing machine only if the container is properly connected to the housing.

18. The beverage-producing machine of claim 16, further comprising a detector constrained to the actuator, and a sensor combined with the housing, said sensor being configured to detect an intermediate position of the actuator, wherein in the intermediate position the bottom aperture of the container is closed by the shutter while the container is still locked to the housing.

19. The beverage-producing machine according to claim 5, wherein the at least one cam profile comprises a first rectilinear portion which extends parallel to the direction of movement of the shutter, and a second portion which is inclined with respect to the direction of movement of the shutter.

20. The beverage-producing machine according to claim 19, wherein the first portion and the second portion define a respective cam channel which is opened at an aperture of the at least one cam profile.

* * * * *